United States Patent
von Grünigen et al.

(10) Patent No.: US 12,299,588 B2
(45) Date of Patent: May 13, 2025

(54) DEVICE AND METHOD FOR DETECTING A FAULT IN A SPINNING MILL AND FOR ESTIMATING ONE OR MORE SOURCES OF THE FAULT

(71) Applicant: Maschinenfabrik Rieter AG, Winterthur (CH)

(72) Inventors: Selwyn von Grünigen, Zürich (CH); David Gehring, Henggart (CH); Nitin T. Patil, Winterthur (CH)

(73) Assignee: Maschinenfabrik Rieter AG, Winterthur (CH)

( * ) Notice: Subject to any disclaimer, the term of this patent is extended or adjusted under 35 U.S.C. 154(b) by 760 days.

(21) Appl. No.: 17/244,087

(22) Filed: Apr. 29, 2021

(65) Prior Publication Data

US 2021/0342705 A1    Nov. 4, 2021

(30) Foreign Application Priority Data

Apr. 30, 2020   (EP) .................................... 20172457

(51) Int. Cl.
   *G06N 5/02*      (2023.01)
   *D01H 13/14*     (2006.01)
   (Continued)

(52) U.S. Cl.
   CPC ............. *G06N 5/022* (2013.01); *D01H 13/14* (2013.01); *G06N 20/00* (2019.01)

(58) Field of Classification Search
   CPC ........ G06N 5/022; G06N 20/00; D01H 13/14; D01H 13/32; G05B 19/41865;
   (Continued)

(56) References Cited

U.S. PATENT DOCUMENTS 5,046,013 A * 9/1991 Ueda ...................... B65H 63/00
                                                                57/264
5,381,340 A * 1/1995 Ueda .................... D01G 31/006
                                                                700/109
(Continued)

FOREIGN PATENT DOCUMENTS

CN              109558852 A1    4/2019
DE     10 2005 019 760 A1    12/2005
(Continued)

OTHER PUBLICATIONS https://towardsdatascience.com/top-10-algorithms-for-machine-learning-beginners, Jorge Castañón, May 1, 2019—Internet Article.
(Continued)

*Primary Examiner* — Ramesh B Patel
(74) *Attorney, Agent, or Firm* — Dority & Manning, P.A.

(57) ABSTRACT

An electronic device and associated method are used to detect a fault in a spinning mill and to estimate one or more sources of the fault, the spinning mill including a plurality of textile machines that sequentially process textile materials. With the electronic device, the method receives parameter information of one or more of the textile machines and of one or more of the textile materials. The electronic device detects faults and location of the faults by identifying parameter information of the textile materials deviating from reference information. The electronic device is used to access configuration information of the textile machines and knowledge-based information related to possible sources of faults in the spinning mill. The method incudes using the electronic device to apply parameter information, configuration information, and knowledge-based information to one or more machine-learning algorithms to estimate the sources of the faults.

17 Claims, 4 Drawing Sheets

(51) Int. Cl.
*G06N 5/022* (2023.01)
*G06N 20/00* (2019.01)

(58) Field of Classification Search
CPC .......... G05B 2219/31263; G05B 2219/45191; G05B 23/0281; G05B 2219/45145; Y02P 90/02; D01G 31/006
See application file for complete search history.

(56) References Cited

U.S. PATENT DOCUMENTS

| | | | |
|---|---|---|---|
| 5,497,335 A | 3/1996 | Hoeller | |
| 5,815,198 A | 9/1998 | Vachtsevanos et al. | |
| 6,535,769 B1 * | 3/2003 | Konar | G05B 19/4184 700/79 |
| 6,679,043 B2 * | 1/2004 | Griesshammer | D01H 5/38 57/97 |
| 6,843,106 B2 * | 1/2005 | Swersey | G01N 15/0826 73/38 |
| 11,319,649 B2 * | 5/2022 | Archontopoulos | D01H 13/22 |
| 2003/0056486 A1 | 3/2003 | Bahlmann et al. | |
| 2013/0073387 A1 * | 3/2013 | Heath | G06Q 30/02 705/14.53 |
| 2019/0187686 A1 | 6/2019 | Cella et al. | |
| 2020/0027339 A1 * | 1/2020 | Gutberlet | D01H 13/32 |
| 2022/0089237 A1 * | 3/2022 | Sverdlov | B25J 9/1697 |
| 2022/0137610 A1 * | 5/2022 | Blaser | G05B 19/41865 235/385 |
| 2023/0368887 A1 * | 11/2023 | Roh | G16H 40/67 |

FOREIGN PATENT DOCUMENTS

| | | |
|---|---|---|
| DE | 4334472 A1 | 4/2009 |
| EP | 0 556 359 A1 | 8/1993 |
| EP | 0 685 580 A1 | 12/1995 |
| EP | 2 352 867 A1 | 8/2011 |
| EP | 3 170 778 A1 | 5/2017 |
| EP | 3 175 025 A1 | 6/2017 |
| EP | 3 293 595 A1 | 3/2018 |
| WO | WO 93/05477 | 3/1993 |
| WO | WO 2010/054497 A1 | 5/2010 |
| WO | WO 2016/016739 A1 | 2/2016 |
| WO | WO 2019/037919 A1 | 2/2019 |
| WO | WO 2019/038630 A1 | 2/2019 |
| WO | WO 2020/053030 A1 | 3/2020 |

OTHER PUBLICATIONS

EPO Search Report, Sep. 10, 2020.
Amin et al., Detecting the Fault From Spectrograms By Using Genetic Algorithm Techniques, in Autex Research Journal, vol. 7, No. 2, Jun. 2007.
Liu et al., Artificial intelligence for fault diagnosis of rotating machinery: A review, Mechanical Systems and Signal Processing; vol. 108, Aug. 2018, pp. 33-47.
Uster@ Tester 5 Anwendungshandbuch, Teil 1, Uster Technologies AG, Version 1.5, Feb. 2013.
USTER@LABORSYSTEME Anwendungsbericht», Uster Technologies AG, Version 4, 2014.
Rashi Desai, Top 9 Algorithms for a Machine Learning Beginner, Towards Data Science, Jan. 15, 2020.
https://web.archive.org/web/20191220141207/https://de.wikipedia/K%C3%Cnstliches_neuronales_Netz.

* cited by examiner

DEVICE AND METHOD FOR DETECTING A FAULT IN A SPINNING MILL AND FOR ESTIMATING ONE OR MORE SOURCES OF THE FAULT

FIELD OF INVENTION

The disclosure relates to a device and a method for detecting a fault in a spinning mill and for estimating one or more sources of the fault.

DESCRIPTION OF RELATED ART

A spinning mill typically includes a large number of textile machines for converting natural and man-made fibers and their blends into yarns of a desired quantity and quality. Several types of textile machines may be arranged along a production line, such as textile machines for fiber preparation, textile machines for spinning preparation, ring spinning machines, compact spinning machines, rotor spinning machines, air-jet spinning machines, automation machines, winding machines, texturing machines, etc. A spinning mill may include several hundred textile machines of different types and may cover an area of several hundred square meters. Furthermore, textile machines may include several hundred or several thousand components, in particular components for processing textile materials running in a parallel manner. During the process of converting natural and man-made fibers and their blends into yarns, textile materials may be opened and cleaned, converted into card sliver, processed by draw frames and/or roving frames, spun into yarns, automatically transported from a previous textile machine to a next textile machine, rewound to assure a proper yarn performance in further manufacturing processes, textured to provide fiber-look to flat filament yarns, etc. In order to provide a desired production capacity along a serial production line, textile machines or components of textile machines may include parallel configurations. Thus, a previous processing step may be serially followed by a next processing step, wherein the previous processing step may require less or more parallel textile machines or components for processing textile materials than the next processing step. For example, the step of fiber preparation delivering slivers may require less parallel machines or components than the step of spinning slivers into yarns. Moreover, for the purpose of flexibility, redundancy, machine maintenance, etc., additional machines may be arranged, which may provide alternative or additional production capacity during particular time periods. Furthermore, for example depending on a production plan requiring less textile machines during the night than during the day, particular textile machines may be brought to a stop during particular time periods. For example, during a later time period, production may involve another set of textile machines than during an earlier time period.

In the operation of a spinning mill, various parameters may be captured. Captured parameters may relate to parameters of textile machines and/or to parameters of textile materials, such as natural and man-made fibers and their blends, slivers, roving, yarns, etc. Parameters of textile machines may relate to physical parameters, chemical parameters, etc. such as rotation speeds, power consumptions, chemical properties of lubricants, etc. Parameters of textile materials may relate to physical parameters, chemical parameters, etc., such as thickness, density, chemical properties of fibers, etc. The spinning mill may include a plurality of sensors for capturing parameters of textile machines and/or textile materials. Capturing parameters of textile machines and/or textile materials may require taking samples from the textile machines and/or the textile materials and examining the samples in laboratories, in particular for determining mechanical/physical and/or chemical properties of the samples.

In the operation of a spinning mill, parameters of textile machines may be continuously or regularly captured and monitored, and if parameters deviate from predefined reference information, it may be concluded that a fault occurred and corrective measures may be taken automatically or manually. The source of faults related to textile machines, for example a rotation speed deviating from reference information, can be often determined and corrected precisely and quickly. However, as not every single parameter of textile machines of a spinning mill can be captured, spinning mills do not include a sufficient number of sensors for detecting every possible fault of textile machines, or in case of broken sensors, it may not be sufficient to detect a fault in a spinning mill by comparing parameters of textile machines with reference information.

Therefore, beside or instead of capturing parameters of textile machines, parameters of textile materials may be additionally or alternatively captured and monitored during production. If parameters of textile materials deviate from reference information, it may be concluded that a fault occurred. However, the source of the fault may not only relate to the textile machine which just produced the defective textile material, but may alternatively or additionally relate to any of the previous upstream processing steps. For example, a respective upstream textile machine may not include required sensors or may have broken sensors, and only in connection with a later processing step it may become detectable that a fault occurred. Thus, the source of the fault which caused the detected fault remains unknown. In present spinning mills, experienced production staff and/or external consultation is required in order to search for the source of faults which have been detected by comparing parameters of textile materials with reference information. However, experienced production staff and/or external consultation may not be always available and a significant delay may result for correcting the source of faults.

It is of utmost importance to correct the source of faults in a spinning mill as quickly as possible, in particular in order to minimize production loss.

EP3175025A1 discloses a monitoring system of a spinning line. Detection devices are associated to textile machines and main storage means for processing a huge amount of data (Big Data) to implement a predictive maintenance. A physical value of a component of a textile machine is detected, for example an operating parameter, for example temperature of a support structure, pressure in a suction duct, acceleration for detecting vibrations, distance between organs of a machine, current absorbed by an electrical motor, force for detecting tensioning of belts, webcam providing images of machines.

EP3170778A1 discloses a textile management system comprising a plurality of textile machines comprising fiber processing units, a control device configured to control the fiber processing units, and one or more shared devices provide on all or some of the fiber processing units, and a management apparatus configured to manage the textile machines. Information on a condition of fiber processing units/shared devices is acquired, a first condition acquiring unit acquires information on the condition of the fiber processing units, information on the condition of the shared device, and information on conditions (e.g. temperature, humidity at installed locations) that are common, examples include a yarn monitoring device for detecting yarn thickness, a vibration sensor for detecting vibration in a winding section, a noise sensor for detecting noise in a yarn joining section, a management apparatus manages the textile machines for managing period maintenance, for analyzing the condition of fiber processing units (e.g. detecting a failure).

EP2352867A1 discloses monitoring a manufacturing process in a textile plant such as a spinning mill when raw material is processed in the manufacturing process in several processing steps into intermediate products and an end product. Parameters of the raw material, the intermediate products and/or the end product are measured in at least two different processing steps, stored in a database and linked in an index file. Thus the employed qualities of a lot are as close as possible to the quality of a lot which can also be designated as necessary quality of a lot in order to offer the yarn quality provided for a delivery agreement.

EP0556359A1 discloses fault diagnosis by an assessment, based on a knowledge base, of signals that indicate the quality of manufactured products, for example on the basis of spectrograms obtained by inspection of the parameters of fiber assemblies or textile filaments. A first evaluation unit is used to detect the characteristic deviations of the spectrograms and generates for each of these differences so-called fault descriptor. A second evaluation unit determines the possible disturbance to each descriptor fault, based on a knowledge base. Faults occurring are automatically detected and can be diagnosed quickly and reliably. The system requires an exact description of the structure of the respective textile machines. Subsystems may be subdivided until one finally arrives to defect-causing components (e.g. cylinder, straps). Each object is described by a node in a tree structure.

EP0685580A1 discloses registering of causes of product faults in yarns, roving and slivers. The registered faults are represented in accordance to predefined parameters for providing an error pattern. The error pattern is used to make a reference to the cause of the fault.

https://towardsdatascience.com/top-10-algorithms-for-machine-learning-beginners-149374935f3c discloses machine learning algorithms and possible real life applications.

SUMMARY OF THE INVENTION

There is a need for a device and a method for detecting a fault in a spinning mill and for estimating one or more sources of the fault. In particular, there is a need for a device and a method for detecting a fault in a spinning mill and for estimating one or more sources of the fault which overcome at least some of the disadvantages of the prior art. In particular, there is a need for a device and a method for detecting a fault in a spinning mill and for estimating one or more sources of the fault enabling fast and precise estimation of the one or more sources of the fault.

Such a need may be met by the subject matter described and enabled herein. Advantageous embodiments are defined in the dependent claims.

Additional objects and advantages of the invention will be set forth in part in the following description, or may be obvious from the description, or may be learned through practice of the invention.

An aspect of the invention relates to an electronic device for detecting a fault in a spinning mill and for estimating one or more sources of the fault, the spinning mill comprising a plurality of textile machines for sequentially processing textile materials. The electronic device is configured to perform the steps of: receiving parameter information of one or more textile machines and of one or more textile materials, detecting the fault and its location by identifying parameter information of textile materials deviating from reference information, accessing configuration information of textile machines of the spinning mill, accessing knowledge-based information related to knowledge about possible sources of possible faults in the spinning mill, and applying parameter information, configuration information, and knowledge-based information to one or more machine-learning algorithms for estimating the one or more sources of the fault.

Parameter information received by the electronic device may include parameter values of components of textile machines, such as a rotation speed of a rotor, a power consumption of a textile machine, a quality of a lubricant, etc. Furthermore, parameter information received by the electronic device may include parameter values of textile materials, such as a diameter of the textile material, a fiber density of the textile material, etc. Parameter information received by the electronic device may relate to parameter values captured by electronic sensors, parameter values determined in laboratory-analyzed findings, etc.

Parameters of textile materials captured may in particular include one or multiple of fiber moisture, micronaire, fiber length, fiber length uniformity, fiber strength, fiber neps, fiber maturity, fiber color, fiber trash, sliver/roving count/hank, sliver/roving weight deviation, sliver/roving evenness, thick places, thin places, twist level, yarn strength, yarn elongation properties, tenacity, twist and count, yarn hairiness, yarn abrasion resistance wear properties, yarn color and others. As well parameters of textile material may include molecular information, such as information used for molecular tagging (including DNA-tagging). Parameters of textile machines may e.g. be captured by taking samples of lubricants in order to determine quality of the lubricant. As well, according to a variation of the present invention parameters of textile machines and/or textile materials may be based on external information provider, such as e.g. quality data of a supplier of textile material (e.g. quality information of raw cotton), type designation/product number and/or material properties and/or expiry date of consumables, such as lubricants.

According to a further variation of the invention, measured values concerning the climatic conditions (e.g. temperature, humidity, solar radiation, sun position (measured or based on external information sources and/or date and/or time)) in a raw material warehouse and/or a warehouse for intermediate and/or a warehouse for finished products can also be recorded as parameters of textile machines and/or textile materials or as environmental parameters. For example, parameters for climatic conditions (e.g., temperature, humidity, solar radiation, sun position (measured or based on external information sources and/or date and/or time)) can also be recorded in at least one sector of a spinning mill. Especially in the area of certain textile machines and/or of at least one individual textile machine and/or of least individual processing unit of at least one individual textile machine. This enables, for example, weather-related influences on production to be taken into account. By capturing such parameters on individual machines or individual processing units, general or intermittent problems in the climate control of a spinning mill can be identified. As such, incorrectly adjusted or aligned nozzles of an air conditioning system may be detected. As well a possible negative influence of open outside doors or solar radiation through windows on the production can be determined. It is also conceivable to capture information on the presence and identity of textile workers as parameters.

If parameter information of textile materials deviates from reference information, the electronic device detects that textile materials are no longer produced in accordance to a predefined quantity and/or quality, and detects the fault in the spinning mill. The location of the fault corresponds to the specific parameter information. For example, if the diameter of a specific textile material produced by a specific textile machine deviates from a reference diameter, the fault is located at this specific textile machine. However, the source of the fault may not only be located in this specific textile machine, the source of the fault may also be located in any previous textile machine which was involved for producing the specific textile material. In the prior art, experienced production staff or external consultation is required for determining the source of the fault. As further production with degraded quantity or quality is not acceptable, the spinning mill or particular textile machines must be stopped until the source of the fault has been determined and corrected.

The electronic device is configured to access configuration information of textile machines of the spinning mill. For example, the configuration information may include information about types of textile machines, location of textile machines, transport systems between textile machines, last maintenance, etc.

The electronic device is configured to access knowledge-based information related to knowledge about possible sources of possible faults in the spinning mill. For example, the knowledge-based information may include information that in case of a specific incorrect variance in the diameter of the textile material, the source of the fault is more likely a draw frame than another textile machine, that in case of a specific incorrect fiber density, the source of the fault is unlikely a draw frame, etc.

The electronic device is configured to apply the information, namely the parameter information, the configuration information, and the knowledge-based information, to machine-learning algorithms for estimating sources of the fault. Machine-learning algorithms enable highly robust and powerful estimation of sources of the fault on the basis of the received and accessed information, thereby enabling estimating sources of the fault fast and precisely.

In some embodiments, the device includes display means such as a computer monitor for displaying the one or more sources of the fault. Accordingly, technical information about the spinning mill is provided fast and precisely, thereby enabling to take corrective measures fast and precisely.

In some embodiments, the device is further configured to take corrective measures automatically. For example, the device includes a network interface and is configured to use information about the one or more sources of the fault to control textile machines via a computer network and respective network interfaces installed in the textile machines. Accordingly, corrective measures are applied fast and precisely.

According to a preferred embodiment of the invention, the device is further configured to perform the step of identifying parameter information of textile materials deviating from reference information by comparing with a threshold a difference between one or more parameter values and one or more reference values. Detection of faults is enabled also in case of complex quantity and/or quality requirements defined by multiple reference values, such as a diameter and a fiber density of textile materials.

According to a preferred embodiment of the invention, the device is further configured to perform the step of: using configuration information for determining one or more possible or likely sequences of textile machines between the location of the fault and the one or more sources of the fault. The machine-learning algorithms can be limited to possible or likely sources of the fault, thereby improving accuracy and speed.

According to a preferred embodiment of the invention, the device is further configured to perform the step of: using configuration information for determining one or more impossible or unlikely sequences of textile machines between the location of the fault and the one or more sources of the fault. Impossible or unlikely sources of the fault can be excluded from the machine-learning algorithms, thereby improving accuracy and speed. For example, a sequence involving textile machines with recent maintenance is less likely than a sequence involving textile machines with maintenance a long time ago.

According to a preferred embodiment of the invention, the device is further configured to perform the step of: using one or more of time-dependent parameter information and time-dependent configuration information. Upon detection of the fault, the device is enabled to use previous parameter information and/or previous configuration information for estimating the one or more sources of the fault. For example, during the night a different set of textile machines may be involved than during the day, wherein impossible sources of the fault can be excluded from the machine-learning algorithms, thereby improving accuracy and speed.

According to a preferred embodiment of the invention, the device is further configured to perform the step of applying parameter information, configuration information, and knowledge-based information to one or more machine-learning algorithms selected from a Linear Regression technique, a Logistic Regression technique, a Support Vector Machine, a Decision Tree, a Random Forest technique, a K-Nearest Neighbors Algorithm, a K-Means Clustering technique, a Naïve Bayes classifier, and a Principal Component Analysis technique, wherein in particular taking into account one or more of incomplete parameter information, incorrect parameter information, incomplete configuration information, incorrect configuration information, incomplete knowledge-based information, and incorrect knowledge-based information. The prior art does not include a disclosure or suggestion of applying information of a spinning mill to machine-learning algorithms from the listed techniques. The listed techniques have the advantage of enabling estimating the sources of the fault fast and precisely. In particular, the listed techniques and algorithms have the advantage of being robust also in case of incomplete information.

According to a preferred embodiment of the invention, the device is further configured to perform the step of: requesting and/or accessing supplemental configuration information, and applying the supplemental configuration information to one or more machine-learning algorithms. In particular, machine-learning algorithms enable a design which can provide information if supplemental configuration information may improve accuracy of estimating the one or more sources of the fault. For example, parameter information and/or configuration information may have been received incompletely and further information may be requested and/or accessed by the electronic device. For example, the additional information may relate to a wear or last replacement of a rotor, which the device initially not has received.

According to a preferred embodiment of the invention, the device is further configured to perform the step of: determining information if textile machines and/or components of textile machines related to the one or more sources of the fault must be replaced, repaired, modified, and/or adjusted differently. For example, the device is configured to access a database having stored sources of faults associated with information if textile machines and/or components of textile machines must be replaced, repaired, modified, and/or adjusted differently.

According to a preferred embodiment of the invention, the device is further configured to perform the step of: determining information related to maintenance work for one or more additional textile machines and/or one or more additional components of textile machines, in particular if maintenance work related to the one or more sources of the fault results in a downtime of one or more textile machines of the spinning mill. Maintenance work may result in a downtime of the spinning mill or textile machines. For example, if a speed frame textile machine receiving textile material from a draw and sliver coiler unit needs to be repaired, technical information relating to maintenance work of the draw and sliver coiler unit can be provided in order to reduce the risk for future sources of faults in the draw and sliver coiler unit.

According to a preferred embodiment of the invention, the device is further configured to perform the step of: receiving feedback information indicating if maintenance work related to the one or more sources of the fault resulted in the correction of the fault, and updating the knowledge-based information accordingly. After a source of the fault has been successfully corrected, knowledge-information can be updated in order to improve accuracy in case of similar or identical faults.

Another aspect of the invention relates to a method for detecting a fault in a spinning mill and for estimating one or more sources of the fault, the spinning mill comprising a plurality of textile machines for sequentially processing textile materials. The method includes the steps of: receiving with an electronic device parameter information of one or more textile machines and of one or more textile materials, detecting with the electronic device the fault and its location by identifying parameter information of textile materials deviating from reference information, accessing with the electronic device configuration information of textile machines of the spinning mill, accessing with the electronic device knowledge-based information related to knowledge about possible sources of possible faults in the spinning mill, and applying with the electronic device parameter information, con-figuration information, and knowledge-based information to one or more machine-learning algorithms for estimating the one or more sources of the fault.

According to a preferred embodiment of the invention, the method further includes: identifying parameter information of textile materials deviating from reference in-formation by comparing with a threshold a difference between one or more parameter values and one or more reference values.

According to a preferred embodiment of the invention, the method further includes: using configuration in-formation for determining one or more possible or likely sequences of textile machines between the location of the fault and the one or more sources of the fault.

According to a preferred embodiment of the invention, the method further includes: using configuration information for determining one or more impossible or unlikely sequences of textile machines between the location of the fault and the one or more sources of the fault.

According to a preferred embodiment of the invention, the method further includes: using one or more of time-dependent parameter information and time-dependent configuration information.

According to a preferred embodiment of the invention, the method further includes: applying one or more machine-learning algorithms which include one or more of a Linear Regression technique, a Logistic Regression technique, a Support Vector Machine, a Decision Tree, a Random Forest technique, a K-Nearest Neighbors Algorithm, a K-Means Clustering technique, a Naïve Bayes classifier, and a Principal Component Analysis technique, wherein in particular taking into account one or more of incomplete parameter information, incorrect parameter information, incomplete configuration information, incorrect configuration information, incomplete knowledge-based information, and incorrect knowledge-based information.

According to a preferred embodiment of the invention, the method further includes: requesting and/or accessing supplemental configuration information, and applying the supplemental configuration information to one or more machine-learning algorithms.

According to a preferred embodiment of the invention, the method further includes: determining in-formation if textile machines and/or components of textile machines related to the one or more sources of the fault must be replaced, repaired, modified, and/or adjusted differently.

According to a preferred embodiment of the invention, the method further includes: determining in-formation related to maintenance work for one or more additional textile machines and/or one or more additional components of textile machines, in particular if maintenance work related to the one or more sources of the fault results in a downtime of one or more textile machines of the spinning mill.

According to a preferred embodiment of the invention, the method further includes: receiving feed-back information indicating if maintenance work related to the one or more sources of the fault resulted in the correction of the fault, and updating the knowledge-based information accordingly.

BRIEF DESCRIPTION OF DRAWINGS

The invention will be better understood with the aid of the description of an embodiment given by way of example an illustrated by the figures, in which.

and

DETAILED DESCRIPTION OF THE INVENTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1:
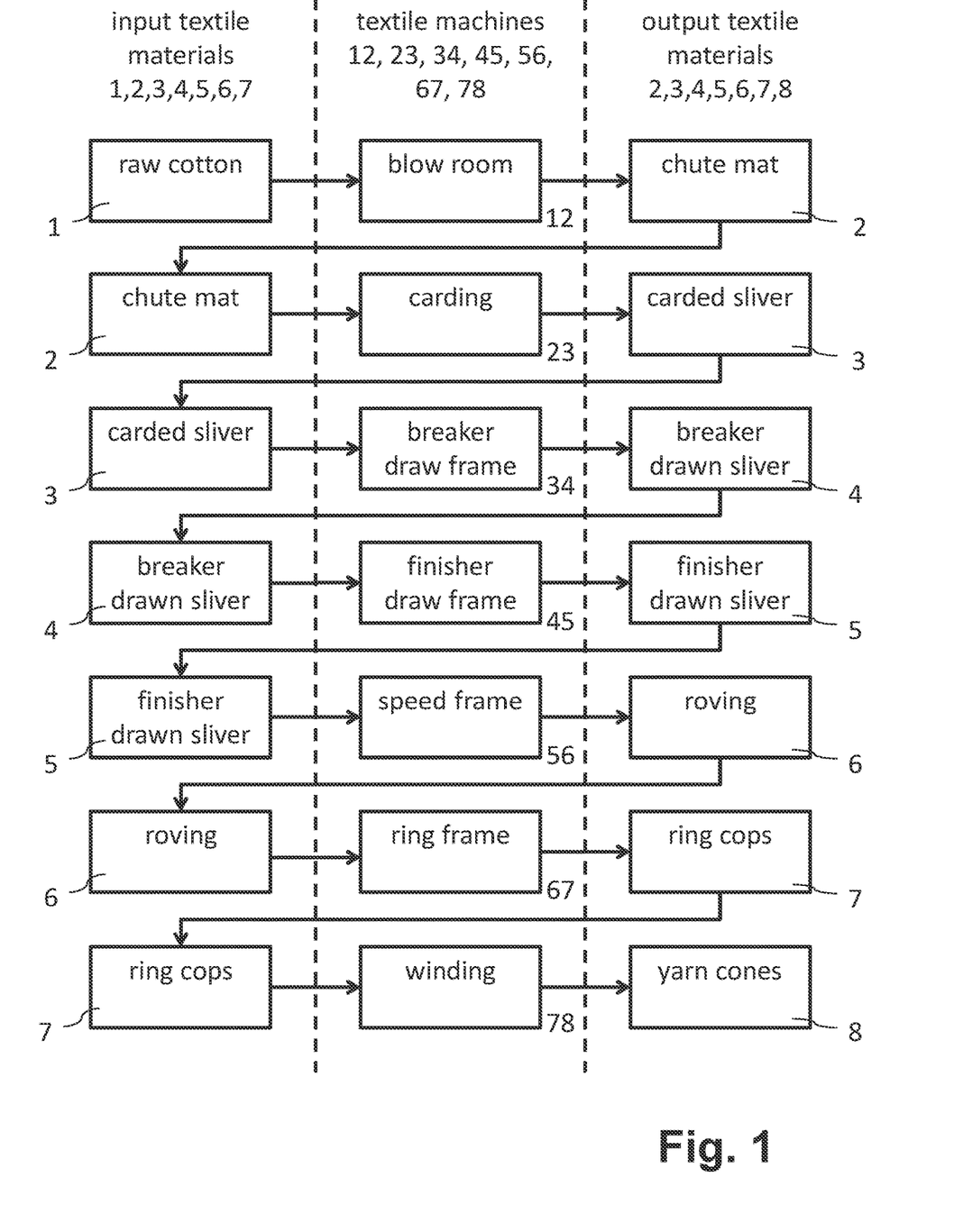
FIG. 1 illustrates schematically exemplary textile machines of a spinning mill for processing input textile materials into output textile materials.

FIG. 1 illustrates schematically exemplary textile machines 12, 23, 34, 45, 56, 67, 78 of a spinning mill for processing input textile materials 1, 2, 3, 4, 5, 6, 7 into output textile materials 2, 3, 4, 5, 6, 7, 8. Depending on the spinning mill, different types of textile machines 12, 23, 34, 45, 56, 67, 78 and/or different sequences of textile machines 12, 23, 34, 45, 56, 67, 78 may be involved. In the example illustrated in FIG. 1, one or more blow room textile machines 12 are arranged for processing raw cotton 1 into chute mat 2. One or more carding textile machines 23 are arranged for processing chute mat 2 into carded sliver 3. One or more breaker draw frame textile machines 34 are arranged for processing carded sliver 3 into break drawn sliver 4. One or more finisher draw frame textile machines 45 are arranged for processing break drawn sliver 4 into finisher draw sliver 5. One or more speed frame textile machines 56 are arranged for processing finisher draw sliver 5 into roving 6. One or more ring frame textile machines 67 are arranged for processing roving 6 into ring cops 7. One or more winding textile machines 78 are arranged for processing ring cops 7 into yarn cones 8.

A spinning mill enables producing from a source textile material 1 a desired textile material 8 in a desired quantity and/or quality. Each of the textile machines 12, 23, 34, 45, 56, 67, 78 illustrated in FIG. 1 is configured for processing in accordance to a desired quantity and/or quality input textile materials 1, 2, 3, 4, 5, 6, 7 into output textile materials 2, 3, 4, 5, 6, 7, 8. Quantity and/or quality of output textile materials 2, 3, 4, 5, 6, 7, 8 depend on parameters of the textile machines 12, 23, 34, 45, 56, 67, 78 and/or on parameters of the input textile materials 1, 2, 3, 4, 5, 6, 7. Quantity and/or quality of output textile materials 2, 3, 4, 5, 6, 7, 8 may not only depend on parameters of the direct input textile material 1, 2, 3, 4, 5, 6, 7 of a particular textile machines 12, 23, 34, 45, 56, 67, 78, but may also depend on parameters of any earlier textile material 2, 3, 4, 5, 6 produced by any earlier textile machine 12, 23, 34, 45, 56, as well as on parameters of the source textile material 1. For example, the direct input textile material 4 of the finisher draw frame 45 is break drawn sliver 4, while the earlier textile materials also include the raw cotton 1, the chute mat 2, and the carded sliver 3. Thus, quantity and/or quality of an output textile material 2, 3, 4, 5, 6, 7, 8 may not only be degraded if quantity and/or quality of the direct input textile material 1, 2, 3, 4, 5, 6, 7 does not match a desired quantity and/or quality, quantity and/or quality of an output textile material 3, 4, 5, 6, 7, 8 may also be degraded if quantity and/or quality of an earlier input textile material 1, 2, 3, 4, 5, 6 does not match a desired quantity and/or quality. For example, quantity and/or quality of the finisher draw sliver 5 produced by the draw frame textile machines 45 may be degraded, if quantity and/or quality of one or more of the raw cotton 1, the chute mat 2, and the carded sliver 3 does not match a desired quantity and/or quality.

Figure 2:
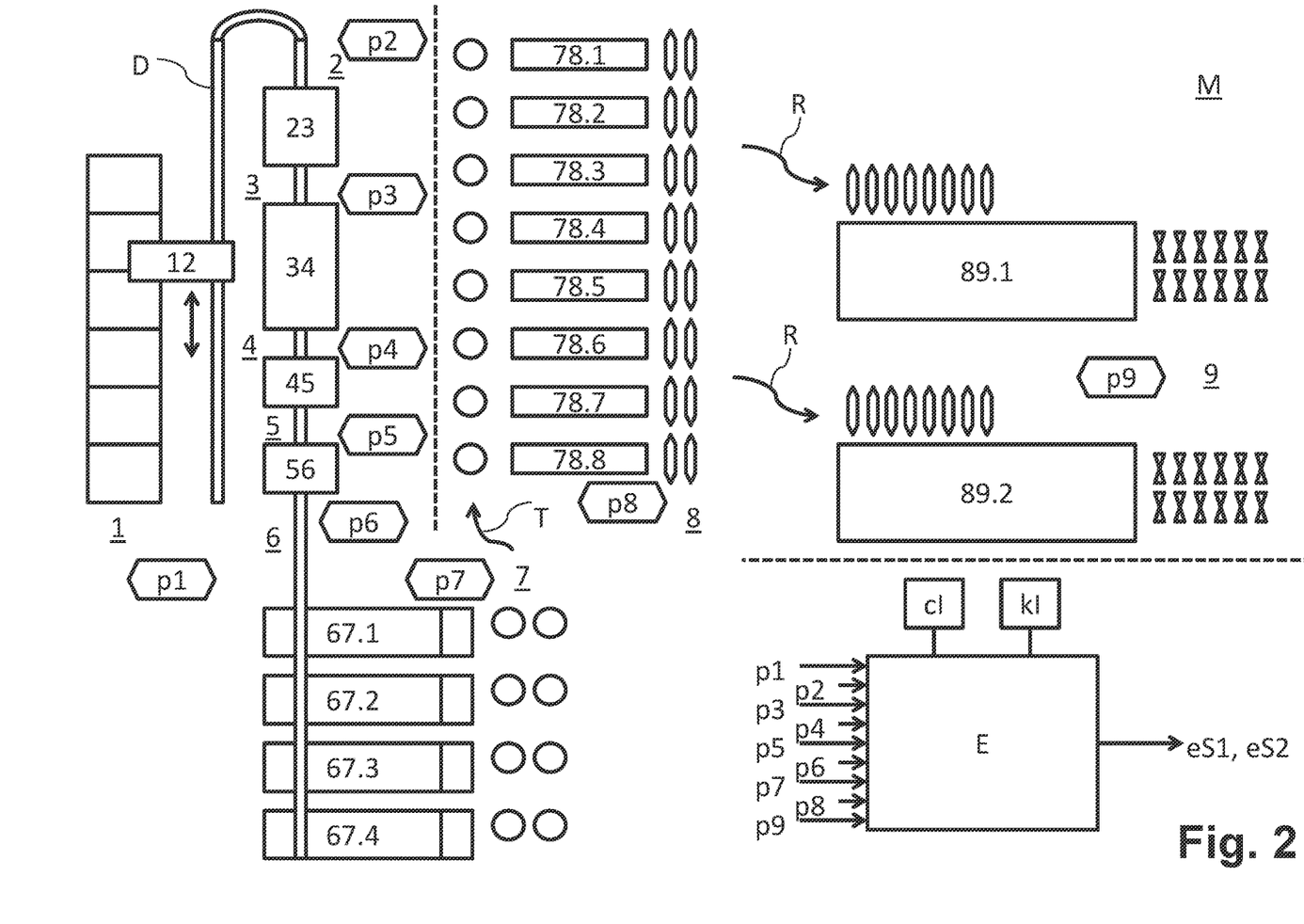
FIG. 2 illustrates schematically an exemplary configuration of a spinning mill, and a device for detecting a fault in the spinning mill and for estimating one or more sources of the fault.

FIG. 2 illustrates schematically an exemplary configuration of a spinning mill M. Furthermore, FIG. 2 illustrates schematically a device E for detecting a fault in the spinning mill and for estimating one or more sources eS1, eS2 of the fault. The spinning mill M illustrated in FIG. 2 includes different and/or additional textile machines than the textile machines illustrated in FIG. 1. The present disclosure is not limited to the exemplary configuration of a spinning mill M illustrated in FIG. 2, but also applies to any other configuration of a spinning mill.

The spinning mill M illustrated in FIG. 2 includes a bale opener 12 for processing raw material 1 into so-called microtufts 2. The bale opener 12 is followed by a pre-cleaner 23 for processing microtufts 2 into pre-cleaned textile material 3. The pre-cleaner 23 is followed by a homogenous mixer 34 for processing pre-cleaned textile material 3 into mixed textile material 4. The homogenous mixer 34 is followed by a storage and feeding machine 45 for finely cleaning the mixed textile material 4 into finely cleaned textile material 5. The storage and feeding machine 45 is followed by a condenser 56 for additionally cleaning the finely cleaned textile material 5 into additionally cleaned textile material 6. The condenser 56 is followed by four draw frame and sliver coiler textile machines 67.1, 67.2, 67.3, 67.4 for processing the additionally cleaned textile material 6 into card sliver coils 7. The four draw and sliver coiler units 67.1, 67.2, 67.3, 67.4 are followed by eight speed frame textile machines 78.1, 78.2, 78.3, 78.4, 78.5, 78.6, 78.7, 78.8 for processing the card sliver cols 7 into the roving 8. The eight speed frame machines 78.1, 78.2, 78.3, 78.4, 78.5, 78.6, 78.7, 78.8 are followed by two ring frame textile machines 89.1, 89.2 for processing the roving 8 into ring cops 9.

As illustrated in FIG. 2, transport systems are arranged for transporting textile materials from a previous textile machine to a next textile machine. The transport systems may include duct systems D, trolley systems T, rail systems R, etc. For example, in a duct system D textile material is transported by means of an air stream generated by a ventilator. For example, in a trolley system T textile material is transported by means of containers arranged on trolleys. For example, in a rail system R textile material is transported by means of transport devices arranged on rails. Other transport systems may be involved. In the example illustrated in FIG. 2, a duct system D is arranged for transporting textile material through the sequence of textile machines which include the bale opener 12, the pre-cleaner 23, the homogenous mixer 34, the storage and feeding machine 45, the condenser 56, and the draw frame and sliver coiler textile machines 67.1, 67.2, 67.3, 67.4. A trolley system T is arranged for transporting textile material from the draw and sliver coiler units 67.1, 67.2, 67.3, 67.4 to the speed frame textile machines 78.1, 78.2, 78.3, 78.4, 78.5, 78.6, 78.7, 78.8. A rail system R is arranged for transporting textile material from the speed frame textile machines 78.1, 78.2, 78.3, 78.4, 78.5, 78.6, 78.7, 78.8 to the ring frame textile machines 89.1, 89.2. Transport systems may be arranged in a different manner.

As illustrated in FIG. 2, parameter information p1, p2, p3, p4, p5, p6, p7, p8, p9 is captured. The parameter information p1, p2, p3, p4, p5, p6, p7, p8, p9 may include parameter values captured from the textile machines 12, 23, 34, 45, 56, 67, 78, 89 and/or parameter values captured from the textile materials 1, 2, 3, 4, 5, 6, 7, 8, 9. FIG. 2 schematically illustrates exemplary locations for capturing parameter information p1, p2, p3, p4, p5, p6, p7, p8, p9. However, in particular because of complexity and/or costs, in a typical configuration of a spinning mill M, one or more of the parameter information p1, p2, p3, p4, p5, p6, p7, p8, p9 of the textile machines 12, 23, 34, 45, 56, 67, 78, 89 and/or textile materials 1, 2, 3, 4, 5, 6, 7, 8, 9 may only be partially captured or not at all captured.

The parameter values of the parameter information p1, p2, p3, p4, p5, p6, p7, p8, p9 may relate to a rotation speed, a power consumption, a maintenance date, etc. of respective textile machines 12, 23, 34, 45, 56, 67, 78, 89. The parameter values of the parameter information p1, p2, p3, p4, p5, p6, p7, p8, p9 may relate to a thickness, a weight, etc. of respective textile materials 1, 2, 3, 4, 5, 6, 7, 8.

For capturing parameter information p1, p2, p3, p4, p5, p6, p7, p8, p9, respective electronic sensors are arranged for capturing respective parameter values.

Electronic sensor may relate to electronic sensors for capturing a rotation speed, electronic sensors for capturing power consumption, etc. For capturing parameter information p1, p2, p3, p4, p5, p6, p7, p8, p9, laboratory-analyzed findings may be required for capturing respective parameter values. Laboratory-analyzed findings may relate to fiber densities, lubricant quality, etc.

Parameter information p1, p2, p3, p4, p5, p6, p7, p8, p9 may be captured regularly or irregularly in time. Parameter information p1, p2, p3, p4, p5, p6, p7, p8, p9 may be captured within short intervals at high speed or within long intervals at low speed. For example, parameter information p1, p2, p3, p4, p5, p6, p7, p8, p9 captured with electronic sensors may be captured regularly at high speed such as every minute, every second, etc. For example, parameter information p1, p2, p3, p4, p5, p6, p7, p8, p9 requiring laboratory-analyzed findings may be captured irregularly at low speed, such as every Monday and Thursday, after machine maintenance, etc.

As illustrated in FIG. 2, the parameter information p1, p2, p3, p4, p5, p7, p8, p9 is captured at specific locations. Accordingly, specific parameter information, such as parameter information with reference sign p3, relates to a specific location in the spinning mill, in particular a specific rotation speed of a rotor of a textile machine, a specific power consumption of a specific textile machine, a specific diameter of a textile material produced by a specific textile machine, etc.

FIG. 2 schematically illustrates an electronic device E for detecting a fault in a spinning mill and for estimating one or more sources eS1, eS2 of the fault in accordance to this disclosure.

The electronic device E may take the form of a computer, for example a computer that is generally used in one place (such as a conventional desktop computer, workstation, server, etc.) as well as a computer that is generally portable (such as a laptop, notebook, tablet, handheld computer, etc.). The electronic device E may include a machine-readable medium having stored thereon instructions which program a processor of the electronic device E to perform some or all of the operations and functions described in this disclosure. A machine-readable medium may include any mechanism for storing or transmitting information in a form readable by a machine (e.g., a computer), such as Hard Disk drives (HD), Solid State Disk drives (SSD), Compact Disc Read-Only Memory (CD-ROMs), Read-Only Memory (ROMs), Random Access Memory (RAM), Erasable Programmable Read-Only Memory (EPROM), etc. In other embodiments, some of these operations and functions might be performed by specific hardware components that contain hardwired logic. Those operations and functions might alternatively be performed by any combination of programmable computer components and fixed hardware circuit components. In one embodiment, the machine-readable medium includes instructions stored thereon, which when executed by a processor, causes the processor to perform the method on an electronic device E as described in this disclosure.

As illustrated in FIG. 2, the electronic device E is configured to receive parameter information p1, p2, p3, p4, p5, p6, p7, p8, p9 of the textile machines 12, 23, 34, 45, 56, 67, 78, 89 and/or of the textile materials 1, 2, 3, 4, 5, 6, 7, 8, 9. For example, electronic sensors configured to capture respective parameter information p1, p2, p3, p4, p5, p6, p7, p8, p9 are arranged at respective locations in the spinning mill M and electronic signals representing the captured parameter information p1, p2, p3, p4, p5, p6, p7, p8, p9 are transmitted from the electronic sensor via a computer network to the electronic device E. Furthermore, parameter information p1, p2, p3, p4, p5, p6, p7, p8, p9 captured in laboratory-analyzed findings may be transmitted via a computer network to the electronic device E. Accordingly, the electronic device E is configured to receive parameter information p1, p2, p3, p4, p5, p6, p7, p8, p9 which includes a wide variety of parameter types captured at a wide variety of locations.

The electronic device E is configured to detect the fault in the spinning mill by identifying parameter information p1, p2, p3, p4, p5, p6, p7, p8, p9 of textile materials 1, 2, 3, 4, 5, 6, 7, 8, 9 deviating from reference information. For example, the difference between one or more parameter values and one or more reference information is compared with a threshold, and the fault in the spinning mill M is detected if the difference exceeds the threshold. For example, the fault in the spinning mill M is detected if the diameter of a textile material exceeds a maximal diameter, or if the diameter of the textile material is below a minimal diameter. Together with detecting the fault, the location of the fault is detected, because each of the parameter information p1, p2, p3, p4, p5, p6, p7, p8, p9 is captured at a specific location in the spinning mill M.

As illustrated in FIG. 2, the electronic device E is configured to access configuration information cI related to a configuration of the spinning mill M. As illustrated in FIG. 2, the configuration information cI may be stored externally from the electronic device E, such as in a database of a computer server having stored information about the spinning mill M. Alternatively or additionally, the configuration information cI may be stored in a machine-readable medium of the electronic device E. The configuration information cI may include information about types of textile machines, model information about textile machines, locations of textile machines, ordering of textile machines, operation times of textile machines, etc.

The configuration information cI enables determining or estimating for any textile material at any location in the spinning mill M the sequence of textile machines which was involved for producing the textile machine. For example, the sequence of textile machines involved for producing a specific cop 9 may include the ring frame textile machine with reference numeral 89.1 which produced the specific cop 9, the speed frame textile machine with reference numeral 78.3, for example because the configuration information cI has stored information that during the relevant time period, textile material produced by the speed frame textile machine with reference numeral 78.3 was transported to the ring frame textile machine with reference numeral 89.1. Furthermore, in this example the configuration information cI indicates that the sequence of textile machines for producing the specific cop 9 includes the draw and sliver coiler unit with reference numeral 67.4, for example because the configuration information cI has stored information that during the relevant time period, textile material produced by draw and sliver coiler unit with reference numeral 67.4 was transported to the speed frame textile machine with reference numeral 78.3. Furthermore, in accordance to the configuration illustrated in FIG. 2, the sequence of textile machines involved for producing the specific cop 9 includes the condenser 56, the storage and feeding machine 45, the homogenous mixer 34, the pre-cleaner 23, and the bale opener 12, for example because the spinning mill M does not include any alternative sequence of textile machines as illustrated in FIG. 2. Thus, if a fault is detected in the specific cop 9 produced by the ring frame machine with reference numeral 89.1, the one or more sources eS1, eS2 of the fault are limited to the ring frame machine with reference numeral 89.1, the speed frame textile machine with reference numeral 78.3, the draw and sliver coiler unit with reference numeral 76.4, the condenser 56, the storage and feeding machine 45, the homogenous mixer 34, the pre-cleaner 23, and the bale opener 12, while the ring frame machine with reference numeral 89.2, the speed frame textile machines with reference numerals 78.1, 78.2, 78.4, 78.5, 78.6, 78.7, 78.8, the draw and sliver coiler units with reference numerals 67.1, 67.2, 67.3 are excluded as possible sources of the fault.

Furthermore, the configuration information cI may include time dependent information, for example in accordance to a production plan involving different textile machines such as during the night and during the day, or such as during maintenance work and during normal production. Thus, for a first point in time it may be necessary to include respectively exclude a different set of textile machines as possible sources of the fault than for a second point in time. The configuration information cI may relate to actual values as well as past values. The configuration information cI may include information about machine settings, such as mechanical settings, technological settings, software settings, etc.

The configuration information cI may include indications if stored information may be incomplete or incorrect. For example, as schematically illustrated in FIG. 2, a trolley system T may be arranged for transporting textile material from frame and sliver coiler textile machines 67.1, 67.2, 67.3, 67.4 to speed frame textile machines 78.1, 78.2, 78.3, 78.4, 78.5, 78.6, 78.7, 78.8. The trolley system may require manual operation by operating personal, wherein operation personnel is instructed to manually record source and destination. Operation personnel may forget to record source and destination, or may record an incorrect source or destination. Accordingly, configuration information cI may include incomplete or incorrect information.

As illustrated in FIG. 2, the electronic device E is configured to access knowledge-based information kI related to knowledge about sources of faults in the spinning mill M. Knowledge about sources of faults in the spinning mill M may relate to long term information gathered by experts in the field of spinning mills. For example, knowledge information may include that in case cops 9 include a yarn having a thickness which varies more than a predefined reference variance the source of the fault is more likely located in a frame and sliver coiler textile machine 67.1, 67.2, 67.3, 67.4 than in a bale opener 12 or storage feeding machine 45, for example. Knowledge information may include information gathered from computer algorithms and artificial intelligence of a specific spinning mill or of a plurality of spinning mills. The plurality of spinning mills may include spinning mills of essentially the same configurations, of spinning mills of similar configurations, of spinning mills of different configurations, etc.

The electronic device E is configured to apply parameter information p1, p2, p3, p4, p5, p6, p7, p8, p9, configuration information cI, and knowledge-based information kI to one or more machine-learning algorithms for estimating the one or more sources of the fault. Thus, information which includes parameter information p1, p2, p3, p4, p5, p6, p7, p8, p9, configuration information cI, and knowledge-based information k is processed using one or more machine-learning algorithms.

The machine-learning algorithms may include one or more of a Linear Regression technique, a Logistic Regression technique, a Support Vector Machine, a Decision Tree, a Random Forest technique, a K-Nearest Neighbors Algorithm, a K-Means Clustering technique, a Naïve Bayes classifier, and a Principal Component Analysis technique.

A Linear Regression technique may detect dependencies within the information. If a fault is detected, or in other words if one of the parameter values deviates from a reference value, a Linear Regression technique may determine other parameter values which still do not deviate from reference values, but have a correlation with the parameter value which deviated from the reference value, thereby enabling estimating the one or more sources of the fault.

Similar to a Linear Regression technique, a Logistic Regression technique may detect dependencies within information related to binary values.

A Support Vector Machine may classify complex information by defining a hyperplane within the space defined by the information. For example, if currently analyzed information is on one side of the hyperplane, it may be estimated that a specific source of the fault is more likely than in case the information is on the other side of the hyperplane.

A Decision Tree may be applied to the information in order to estimate the one or more sources of the fault. In accordance to a Decision Tree, information is stepwise analyzed in order to estimate the one or more sources of the fault.

A Random Forest technique may be applied to the information in order to estimate the one or more sources of the fault. In accordance to a Random Forest technique, the information is applied to a collection of decision trees in order to estimate the one or more sources of the fault. A random forest is based on splitting features or information into a subset of trees. The model considers only a small subset of features or information rather than all of the features or information. A random forest can be executed in parallel on different computing engines, such as different cores of a processor, different processors of a computer system, different computer systems, etc., thereby enabling estimating the one or more sources of the fault within a predefined time period, in particular in case of high complexity. A random forest can handle different classes of features or information, such as binary features or information, categorical features or information, numerical features or information, etc. A random forest enables estimating the one or more sources of the fault without or with little pre-processing of the features or information and there is no need to rescale or transform the features or information. A random forest is particularly well suited in case of high dimensional data, features or information because execution is limited to subsets of data, features or information.

A K-Nearest Neighbors Algorithm may be applied to the information in order to estimate the one or more sources of the fault. In accordance to a K-Nearest Neighbors Algorithm, the information is applied to classes which have been defined on the basis of sample information and K nearest neighbors of the samples.

A K-Means Clustering technique may be applied to the information in order to estimate the one or more sources of the fault. In accordance to a K-Means Clustering technique, the information is applied to clusters which have been defined on the basis of sample information and an optimization of centroid position.

A Naïve Bayes classifier may be applied to the information in order to estimate the one or more sources of the fault. In accordance to a Naïve Bayes classifier, the information is classified in accordance to the Bayes rule.

A Principal Component Analysis technique may be applied to the information in order to estimate the one or more sources of the fault. In accordance to a Principal Component Analysis technique, a set of correlated variables is converted to a set of uncorrelated variables in order to remove redundancies.

Machine-learning algorithms may include generic algorithms such as Artificial Neural Networks (best for data patterns), Convolutional Neural Networks (best for images), Recurrent Neural Networks (best for audio signals), Self-Organizing Maps (best for feature detection), Deep Boltzmann Machines (best for system modelling), AutoEncoders (best for property detection), etc.

One or more machine-learning algorithm may be applied to the information depending on the class or type of a spinning mill.

An Artificial Neural Network (ANN) may be applied to the information in order to estimate the one or more sources of the fault by executing regression and classification where patterns and sequences are recognized. In accordance to an Artificial Neural Network, information is stepwise analyzed in order to estimate the one or more sources of the fault.

A Convolutional Neural Network (CNN) may be applied to still image, video stream, visual and other two-dimensional data in order to estimate the one or more sources of the fault. In accordance to a convolutional neural network a mathematical operation called convolution is applied in order to find specific features to estimate the one or more sources of the fault.

A Recurrent Neural Network (RNN) may be applied to time series data, sequence modeling or audio signals (including noise patterns) in order to estimate the one or more sources of the fault. In accordance to Recurrent Neural Network, long short-term memory (LSTM) is used to process data within their internal state (memory) to process variable length sequences of inputs in order to estimate the one or more sources of the fault.

Self-Organizing Maps (SOM) may be applied to the information for reduction of the dimensionality and visual representation of data. In accordance with Self-Organizing Maps competitive learning is applied to approximate the data distribution in order to estimate the one or more sources of the fault.

A K-Means Clustering technique may be applied to cluster data into separate partitions in order to estimate the one or more sources of the fault. In accordance to a K-Means Clustering techniques are used for feature learning where the information is applied to clusters which have been defined on the basis of sample information and an optimization of centroid position Deep Bolzmann Machines (DBM) may be applied to model and monitor the behavior of a spinning mill or its subsystem including climatic conditions in order to estimate the one or more sources of the fault. In accordance to a Deep Bolzmann Machine internal representations are learned to represent and solve difficult combinatoric problems in order to estimate the one or more sources of the fault.

AutoEncoders may be applied to information for dimensionality reduction (decoding) and information retrieval (encoding) in order to estimate the one or more sources of the fault. In accordance with AutoEncoders different input representations are learned to assume useful properties in order to estimate the one or more sources of the fault.

Artificial Neural Networks, Convolutional Neural Networks and Recurrent Neural Networks belong to the class of supervised machine-learning algorithms. Self-Organizing Maps, Deep Boltzmann Machines and AutoEncoders belong to the class of unsupervised machine-learning algorithms. Artificial Neural Networks may be used for regression and classification. Convolutional Neural Networks may be used for computer vision. Recurrent Neural Networks may be used for time series analysis. Self-Organizing Maps may be used for feature detection. Deep Boltzmann Machines and AutoEncoders may be used for recommendation systems.

The source of the fault may relate to wrongly adjusted textile machines 12, 23, 34, 45, 56, 67, 78, 89, to wear of components of textile machines 12, 23, 34, 45, 56, 67, 78, 89, etc.

Estimating the source of the fault may include a step of providing information if textile machines 12, 23, 34, 45, 56, 67, 78, 89 and/or components of textile machines 12, 23, 34, 45, 56, 67, 78, 89 must be replaced, repaired, modified, adjusted differently, etc.

Figure 3:
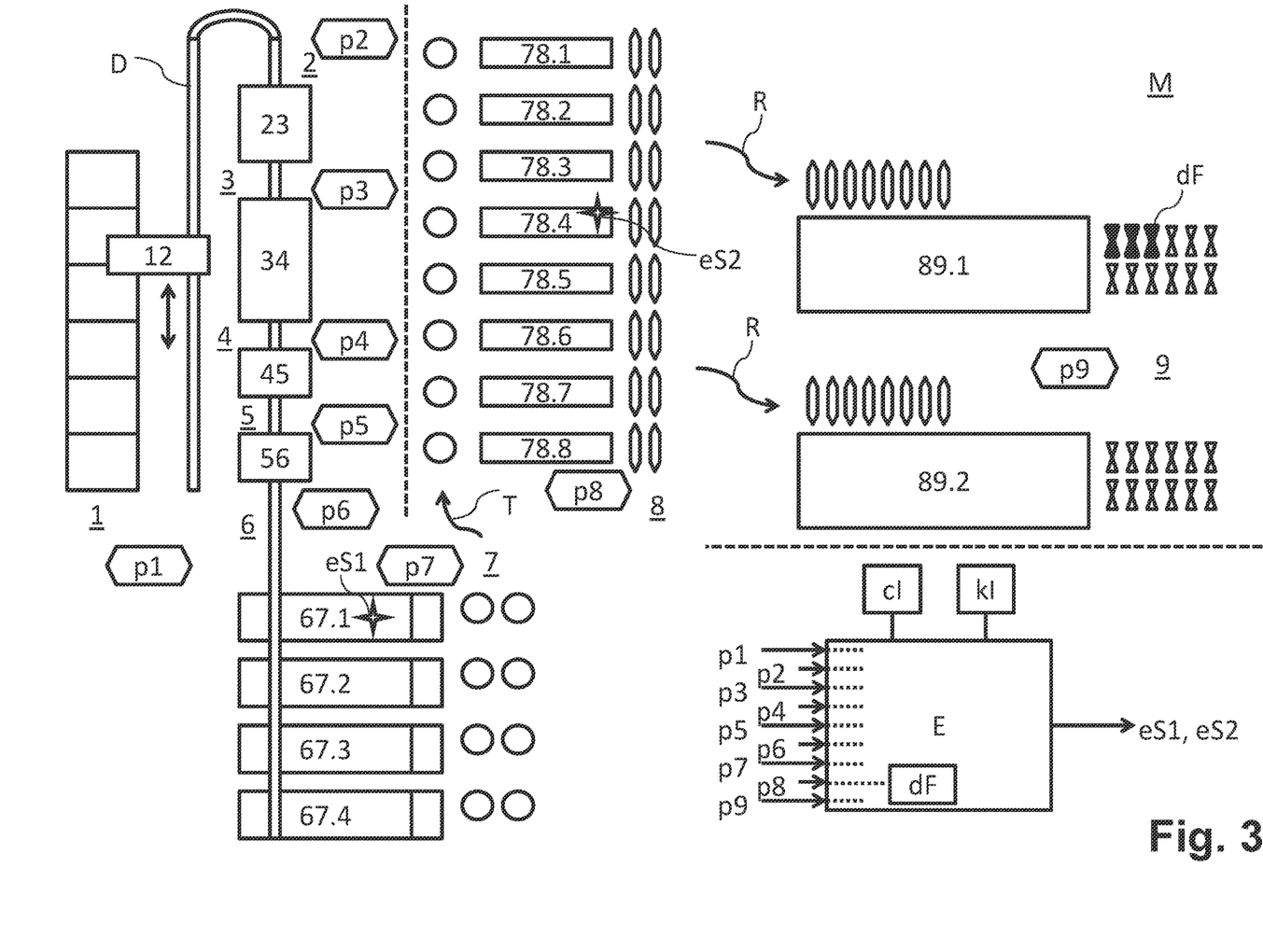
FIG. 3 illustrates schematically an exemplary configuration of a spinning mill, a detected fault, two possible sources of the fault, and a device for detecting the fault in the spinning mill and for estimating the two possible sources of the fault.

FIG. 3 illustrates schematically an exemplary configuration of a spinning mill, a detected fault, two possible sources of the fault, and a device for detecting the fault in the spinning mill and for estimating the two possible sources of the fault.

The electronic device E receives parameter information p1, p2, p3, p4, p5, p6, p7, p8, p9) related to one or more parameters of the textile machines 12, 23, 34, 45, 56, 67, 78, 89 and of one or more textile materials 1, 2, 3, 4, 5, 6, 7, 8, 9. For example, upon receipt of a new parameter value, the parameter value is compared to a reference value. For example, a diameter of the textile material is compared with a reference diameter. A fault is detected if the parameter deviates from the reference information. Because of information about the location or origin of the parameter value, such as the location of a sensor, the location of the fault is also detected. Thus, the electronic device E detects the fault dF in the spinning mill M and the location of the fault by identifying parameter information p1, p2, p3, p4, p5, p6, p7, p8, p9 related to one or more parameters of one or more textile materials 1, 2, 3, 4, 5, 6, 7, 8, 9 which deviate from reference information. In the exemplary configuration illustrated in FIG. 3, the fault dF relates to cops 9 produced by the ring frame textile machine with reference numeral 89.1.

The electronic device E accesses configuration information cI related to the configuration of the spinning mill M and knowledge-based information kI related to knowledge about sources of faults in the spinning mill M and applies parameter information p1, p2, p3, p4, p5, p6, p7, p8, p9, configuration information cI, and knowledge-based information kI to one or more machine-learning algorithms for estimating the one or more sources of the fault eS1, eS2. In the example illustrated in FIG. 3, two sources of the fault eS1, eS2 are estimated, wherein the first source of the fault with reference sign eS1 concerns the frame and sliver coiler textile machine with reference numeral 67.1, and the second source of the fault with reference sign eS2 concerns the speed frame textile machine with reference numeral 78.4.

For example, a Random Forest technique was applied to parameter information p1, p2, p3, p4, p5, p6, p7, p8, p9, configuration information cI and knowledge information kI and resulted in the estimation of the first source eS1 and the second source eS2.

Figure 4:
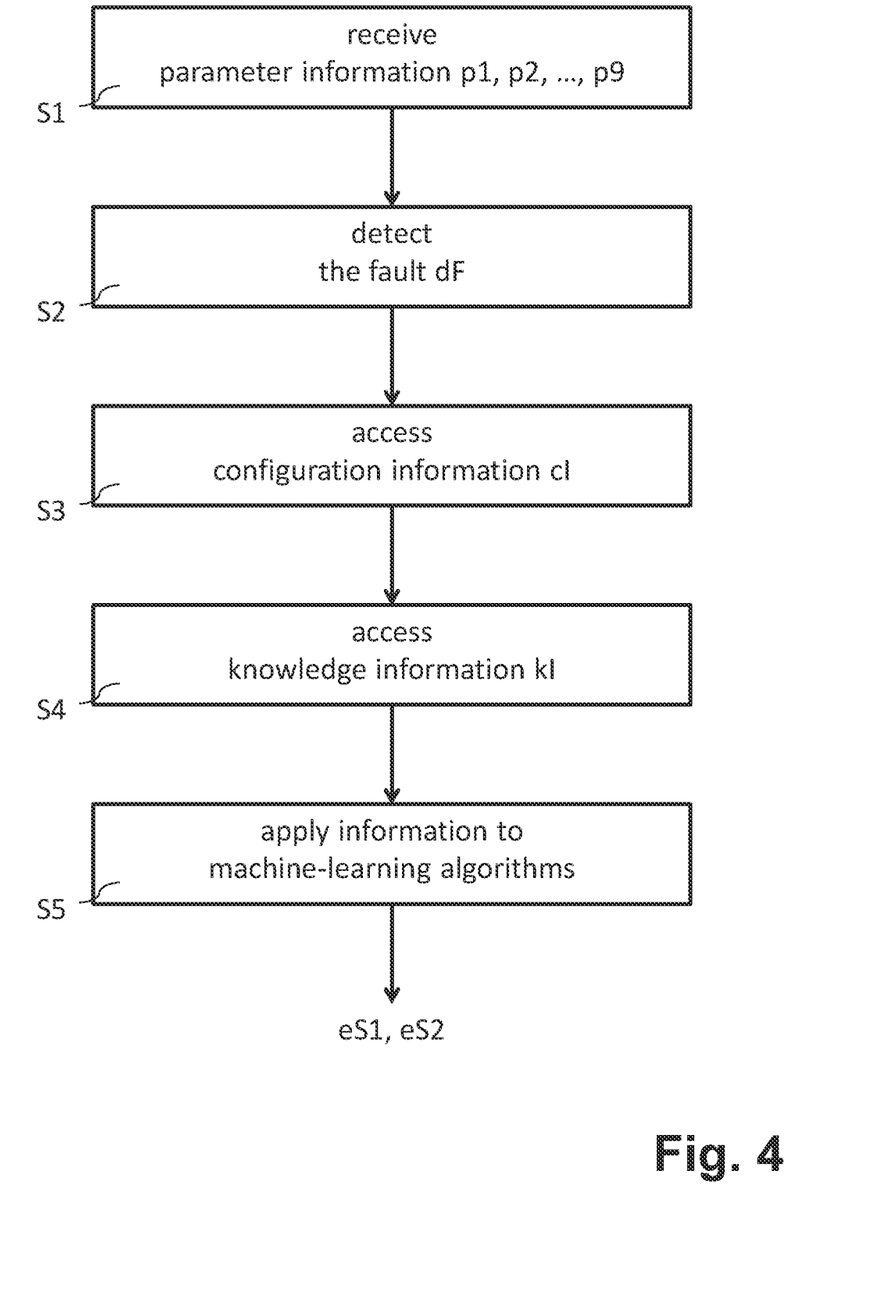
FIG. 4 illustrates schematically possible method steps of a method for detecting that a spinning mill has a fault and for estimating one or more sources of the fault.

FIG. 4 illustrates schematically possible method steps of a method for detecting that a spinning mill has a fault dF and for estimating one or more sources of the fault eS1, eS2. In step S1, an electronic device E receives parameter information p1, p2, p3, p4, p5, p6, p7, p8, p9 of one or more textile machines (12, 23, 34, 45, 56, 67, 78, 89) and of one or more textile materials 1, 2, 3, 4, 5, 6, 7, 8, 9. In step S2, the electronic device E detects the fault dF and its location by identifying parameter information p1, p2, p3, p4, p5, p6, p7, p8, p9 of textile materials 1, 2, 3, 4, 5, 6, 7, 8, 9 deviating from reference information. In step S3, the electronic device E accesses configuration information cI of textile machines 12, 23, 34, 45, 56, 67, 78, 89 of the spinning mill M. In step S4, the electronic device accesses knowledge-based information kI related to knowledge about possible sources eS' of possible faults dF' in the spinning mill M. In step S5, the electronic device applies parameter information p1, p2, p3, p4, p5, p6, p7, p8, p9, con-figuration information cI, and knowledge-based information kI to one or more machine-learning algorithms for estimating the one or more sources eS1, eS2 of the fault dF.

REFERENCE NUMERALS/SIGNS

M spinning mill
1,2,3,4,5,6,7,8,9 textile materials
12,23,34,45,56,67,78,89 textile machines
p1,p2,p3,p4,p5,p6,p7,p8,p9 parameters of the textile machines and/or the textile materials
D duct system
T trolley system
R rail system
E electronic device for detecting that a spinning mill has a fault and for estimating a source of the fault
cI configuration information of the spinning mill
kI knowledge-based information of the spinning mill
dF detected fault

The invention claimed is:

1. A spinning mill system configured for determining possible sources of a fault within the spinning mill, the system comprising:
a plurality of sequentially arranged textile machines that sequentially process textile materials;
a plurality of electronic sensors located at different locations along the textile machines, the electronic sensors located and configured to detect parameter information related to: (a) operating characteristics of the textile machines; and (b) characteristics of the textile materials produced by the textile machines;
an electronic storage source of configuration information related to the textile machines such that, for any of the textile materials, a sequence and particular ones of the textile machines involved in producing the textile material is identifiable from the configuration information;
an electronic storage source of knowledge-based information related to sources of faults in the spinning mill, the knowledge-based information including one or more of: knowledge based on experience of spinning mill experts, knowledge generated by computer algorithms or artificial intelligence related to the spinning mill, spinning mills of a similar or same configuration, or spinning mills of a different configuration;
an electronic device in communication with the electronic sensors, the electronic storage source of configuration information, and the electronic storage source of knowledge-based information, the electronic device further configured to receive parameter information related to (c) laboratory-analyzed findings for the textile materials, wherein the electronic device is configured to perform the following:
compare the parameter information related to (a), (b), and (c) to reference values, wherein the fault is defined when the parameter information related to one or more of (a), (b), or (c) exceeds a respective threshold reference value; and
apply the parameter information related to (a), (b), and (c), the configuration information, and the knowledge-based information to one or more machine-learning algorithms to estimate the possible sources and location of the fault.

2. The spinning mill system according to claim 1, wherein the electronic device is configured to use the configuration information to determine one or more possible sequences of the textile machines between the location of the fault and the possible sources of the fault.

3. The spinning mill system according to claim 1, wherein the electronic device is configured to use the configuration information to determine one or more unlikely sequences of the textile machines between the location of the fault and the possible sources of the fault.

4. The spinning mill system according to claim 1, wherein the parameter information related to one or more of (a), (b), and (c) includes time-dependent parameter information and the configuration information includes time-dependent configuration information.

5. The spinning mill system according to claim 1, wherein the one or more machine-learning algorithms is selected from: a Linear Regression technique, a Logistic Regression technique, a Support Vector Machine, a Decision Tree, a Random Forest technique, a K-Nearest Neighbors Algorithm, a K-Means Clustering technique, a Naïve Bayes classifier, and a Principal Component Analysis technique.

6. The spinning mill system according to claim 5, wherein the electronic device is furthered configured to request or access supplemental configuration information, and apply the supplemental configuration information to the one or more machine-learning algorithms.

7. The spinning mill system according to claim 1, wherein the electronic device is further configured to determine if one or more of the textile machines or components of the textile machines related to the possible sources of the fault must be replaced, repaired, modified, or adjusted differently.

8. The spinning mill system according to claim 7, wherein the electronic device is further configured to determine if maintenance work on the textile machines or the components of the textile machines related to the possible sources of the fault will result in a downtime of the textile machine or the spinning mill.

9. The spinning mill system according to claim 7, wherein the electronic device is further configured to receive feedback information indicating if maintenance work on the textile machines or the components of the textile machines related to the possible sources of the fault resulted in correction of the fault, and to update the knowledge-based information accordingly.

10. A method for detecting a fault in a spinning mill and for estimating possible sources of the fault, the spinning mill including:

a plurality of textile machines that sequentially process textile materials;

a plurality of electronic sensors located at different locations along the textile machines, the electronic sensors located and configured to detect parameter information related to: (a) operating characteristics of the textile machines and (b) characteristics of the textile materials produced by the textile machines;

an electronic storage source of configuration information related to the textile machines such that, for any of the textile materials, a sequence and particular ones of the textile machines involved in producing the textile material is identifiable from the configuration information;

an electronic storage source of knowledge-based information related to faults in the spinning mill, the knowledge-based information including one or more of: knowledge based on experience of spinning mill experts, knowledge generated by computer algorithms or artificial intelligence related to the spinning mill, spinning mills of a similar or same configuration, or spinning mills of a different configuration; and an electronic device in communication with the electronic sensors, the electronic storage source of configuration information, and the electronic storage source of knowledge-based information; the electronic device further configured to receive parameter information related to (c) laboratory-analyzed findings for the textile materials;

the method comprising:

with the electronic device, receiving and comparing the parameter information related to (a), (b), and (c) to reference values, wherein the fault is defined when the parameter information related to one or more of (a), (b), and (c) exceeds a respective threshold reference value;

with the electronic device, applying the parameter information related to (a), (b), and (c), the configuration information, and the knowledge-based information to one or more machine-learning algorithms;

with the electronic device and the one or more machine-learning algorithms, estimating possible sources and a location of the fault; and with the electronic device, receiving feedback information indicating if maintenance work on the textile machines or the components of the textile machines related to the possible sources of the fault resulted in correction of the fault, and updating the knowledge-based information accordingly.

11. The method according to claim 10, comprising, with the electronic device, using the configuration information to determine one or more possible sequences of the textile machines between the location of the fault and the possible sources of the fault.

12. The method according to claim 10, comprising, with the electronic device, using the configuration information to determine one or more unlikely sequences of the textile machines between the location of the fault and the possible sources of the fault.

13. The method according to claim 10, wherein the parameter information related to one or more of (a), (b), and (c) includes time-dependent parameter information and the configuration information includes time-dependent configuration information.

14. The method according to claim 10, wherein the one or more machine-learning algorithms is selected from: a Linear Regression technique, a Logistic Regression technique, a Support Vector Machine, a Decision Tree, a Random Forest technique, a K-Nearest Neighbors Algorithm, a K-Means Clustering technique, a Naïve Bayes classifier, and a Principal Component Analysis technique.

15. The method according to claim 10, comprising, with the electronic device, requesting or accessing supplemental configuration information, and applying the supplemental configuration information to the one or more machine-learning algorithms.

16. The method according to claim 10, comprising, with the electronic device, determine if one or more of the textile machines or components of the textile machines related to the possible sources of the fault must be replaced, repaired, modified, or adjusted differently.

17. The method according to claim 16, comprising, with the electronic device, determining if maintenance work on the textile machines or the components of the textile machines related to the possible sources of the fault will result in a downtime of the textile machine or the spinning mill.

* * * * *